SELF-ADAPTIVE SYSTEMS

Filed Dec. 20, 1963 5 Sheets-Sheet 1

INVENTORS
HERBERT J. GREENBERG
LAWRENCE P. HORWITZ
BY Edward G. Fiorito
ATTORNEY

SELF-ADAPTIVE SYSTEMS

Filed Dec. 20, 1963

SELF-ADAPTIVE SYSTEMS

Filed Dec. 20, 1963 5 Sheets-Sheet 3

July 25, 1967 H. J. GREENBERG ETAL 3,333,248

SELF-ADAPTIVE SYSTEMS

Filed Dec. 20, 1963 5 Sheets-Sheet 5

3,333,248
SELF-ADAPTIVE SYSTEMS

Herbert J. Greenberg, Scarsdale, and Lawrence P. Horwitz, Chappaqua, N.Y., assignors to International Business Machines Corporation, New York, N.Y., a corporation of New York Filed Dec. 20, 1963, Ser. No. 332,153
15 Claims. (Cl. 340—172.5)

This invention relates to computers, and more particularly to self-adaptive computers which are "trained" to recognize signal patterns.

Ordinarily self-adaptive computers are trained by presenting a number of sample patterns initially. During this initial or training mode of operation the computer sets up a group of reference patterns, each one corresponding to a different one of the sample patterns. The computer is subsequently transferred from the training mode to an operate mode during which new patterns are presented to the computer for recognition. The new patterns are compared with each of the reference patterns to determine which reference pattern matches most closely with the input pattern.

Frequently problems arise in self-adaptive computers of the type described above in selecting the number of different sample patterns to be used during the training mode. Ordinarily all of the possible patterns that could be presented for recognition must be applied to the computer during the training mode so that discrimination between each one of the sample patterns can be made during the operate mode. Therefore in the case where all of the possible patterns that may be presented to the computer for recognition are not known initially, proper training cannot be achieved. For example in certain languages, some of the characters are rarely used and may not appear in a document, or book. Therefore it may be unnecessary to use all of the characters in the particular language during the training mode. Although one may scan the document or book to determine which of the characters are employed therein before beginning the training mode, this preliminary procedure would require almost as much time as that required to manually identify each of the characters, thereby defeating the advantage of the high speed computer operation.

Another problem related to the one above occurs where there is a variety of patterns which are all members of the same class. For example the self-adaptive computer may be used to recognize patterns representing printed characters, where the characters are formed by different type fonts. In such an application the same letter or number may appear slightly different due to the style of the fonts. Therefore during the training mode each style of font for each character would ordinarily be presented to the self-adaptive computer so that the reference patterns for each character could be broadened to accommodate each style of font.

In some applications all of the styles of fonts would not be available during the training mode. For example where sales orders are received from many different sources, over an extended period of time, it may be undesirable to wait until all of the orders are received before beginning to process the information contained in the orders already received.

Another related problem occurs where self-adaptive computers are used to control manufacturing, distillation and other processes. Here measurements are made while the process is being performed. The measurements may include temperature, weight, color, size, chemical composition, etc. These measurements constitute a pattern of data which defines the condition of the process at the time the measurements are taken. When the condition of the process changes the pattern of data also changes.

The self-adaptive computer performs the function of identifying each pattern of data as a member of one of a number of different classes of conditions. Once the condition of the process is determined, correction can be made to optimize the process. For example the temperature might be raised, the size reduced, etc.

It can be seen that the number of different possible patterns of data is exceedingly large. Each of the measurements may vary slightly to create a new pattern of data. All of the possible patterns would have to be considered during the training mode of the self-adaptive computer since slight variations in some of the measurements may require adjustment in the process, while relatively large variations in other measurements may be tolerated without adjustment of the process. Further it may not be known during the training mode, whether certain patterns will eventually occur during the process. Therefore these non-occurring patterns are unnecessary during the training mode. As in the character recognition application employing various type fonts, all of the possible patterns that could be presented for identification are not known during the initial training mode.

There are still other occasions when none of the sample patterns are known in the beginning. For example one may have a random assemblage of patterns of data having no known common features. Here the purpose of the self-adaptive computer is to determine what the common features are, and to classify each of the patterns into groups having the same common features. In this application the self-adaptive computer is also "self-trained." One example of the usefulness of such a device is in classifying blood cells into groups having common features which are unknown at the beginning to determine whether patients having common ailments also have common features in their blood cells.

It is an object of the present invention to provide an improved self-adaptive computing system.

Another object of the present invention is to provide a self-adaptive computing system for use in applications wherein some, or all of the reference patterns are not available during the initial training mode.

An additional object of the present invention is to provide a self-adaptive pattern classifying system which is capable of being "self-trained."

A further object of the present invention is to provide a self-adaptive pattern identifying system which trains on only those patterns actually presented for recognition.

Still another object of the present invention is to provide a self-adaptive pattern identifying system capable of accommodating patterns presented during the operation mode which differ slightly from those sample patterns which are members of the same class.

Another object of the present invention is to provide a self-adaptive character recognition system capable of reading a document, or book without initially determining the presence of all characters contained therein.

A further object of the present invention is to provide a self-adaptive character recognition system capable of accommodating various styles of type fonts without requiring that each font be determined prior to the initial training mode.

Still another object of the present invention is to provide a self-adaptive process control system which trains on only those process conditions that actually occur.

Another object of the present invention is to provide a self-adaptive process control system which is capable of controlling variations in the measurements of the process occurring after the initial training mode which are members of the same class of process conditions as one of the sample measurements used to train the self-adaptive system.

These and other objects of the present invention are accomplished by adding an additional storage facility to a self-adaptive circuit. Each of the sample patterns is stored in the additional facility for use during later training modes. When a pattern is presented for recognition which cannot be recognized, hereinafter called a rejected pattern, the self-adaptive circuit is re-trained on the sample patterns stored in the additional facility, and is further trained, or updated, using the unidentified pattern.

The updating is accomplished in a variety of ways. The rejected pattern may be one of two different types. First, it may be a new pattern unrelated to any of the other sample patterns, and therefore a member of a new class of patterns. In this case a new reference pattern is created in the self-adaptive circuit which compares favorably with the rejected character, and provides a mismatch with all other sample patterns. Second, the rejected pattern may be a variation (due to font styles, etc.) of one of the sample patterns. In this case the corresponding reference pattern in the self-adaptive circuit is adjusted to accommodate both the original sample pattern and the slightly changed rejected pattern.

In accordance with the present invention, control apparatus is provided which updates the self-adaptive circuit depending upon the type of reject pattern at hand. Provision is made for assistance by an operator, or for completely automatic means for updating the self-adaptive circuit.

The present invention can be put into useful operation before all of the patterns to be recognized are known. Therefore a document, or book, may be read after training on a few of the more commonly used characters. If a new character is presented, updating of the self-adaptive circuit can be achieved without rescanning the document to seek out all of the sample characters previously used for training. In this manner no unnecessary training is performed using characters not appearing in the document or book to be read.

Another advantage of the present invention is the ability to accommodate slight variations in the patterns presented for recognition which are members of the same classes as the original sample patterns. This feature of the present invention will be referred to hereinafter as "dynamic updating." The purpose of this type of updating is to adjust the reference patterns to accommodate slight deviations in the input patterns. As discussed above the deviations may be brought about abruptly by a change in the style of type font. However gradual deviations in the input pattern may be brought about by the wearing of typewriter ribbons over a period of time, or for example by gradual environmental changes such as temperature. This type of updating is referred to as dynamic updating since the adjustments are made while the adaptive computer is performing useful operations.

Where the control apparatus of the present invention is operated automatically, the self-adapting circuit is "self-trained." Here, the computer decides whether a rejected pattern is similar enough to a previous pattern stored in the additional facility to be a member of the same class, or whether the rejected pattern is so dissimilar as to form the beginning of a new class of patterns. Accordingly, reference patterns are adjusted to accommodate both the rejected character and the similar previous pattern in the former case, or reference patterns corresponding to a new class are adjusted to match with the rejected pattern in the latter case.

The foregoing and other objects, features and advantages of the invention will be apparent from the following more particular description of preferred embodiments of the invention, as illustrated in the accompanying drawings.

In the drawings:

FIG. 2 is a chart illustrating the manner in which FIGS. 2*a* through 2*c* are grouped together to form a composite drawing;

Figure 1:
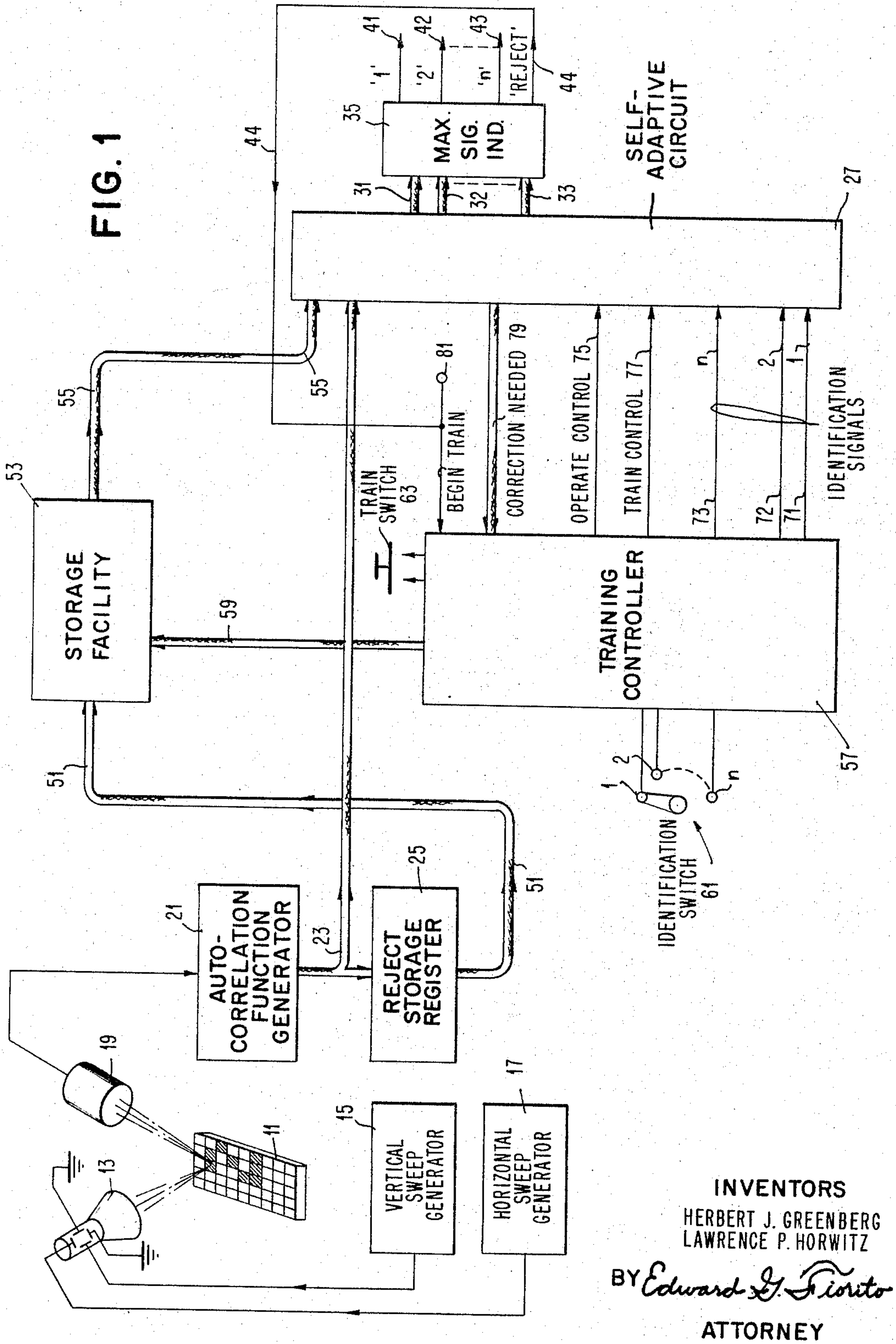
FIG. 1 is a block diagram of one embodiment of the present invention.
Figures 2, 2A:
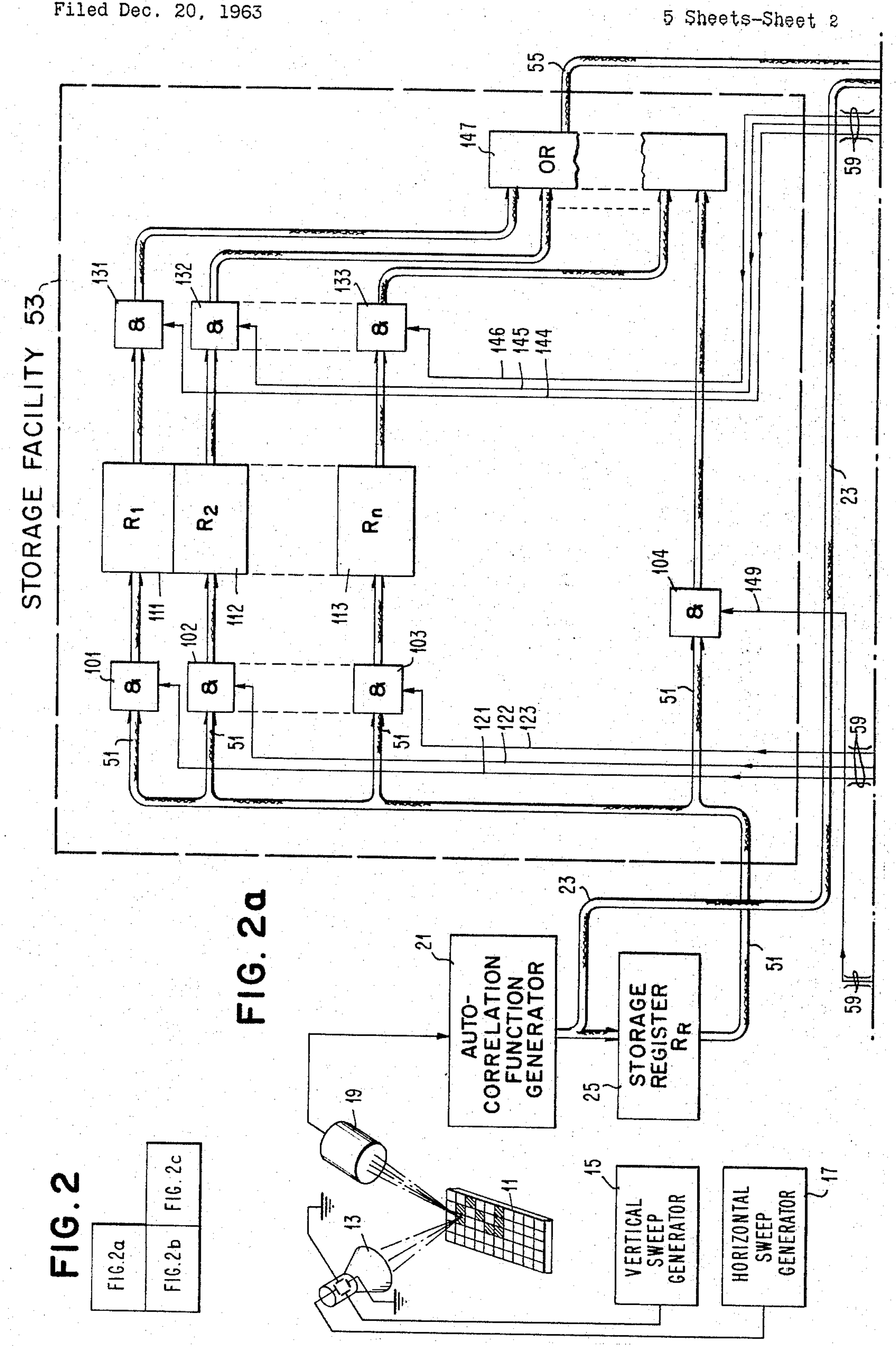
Figure 2B:
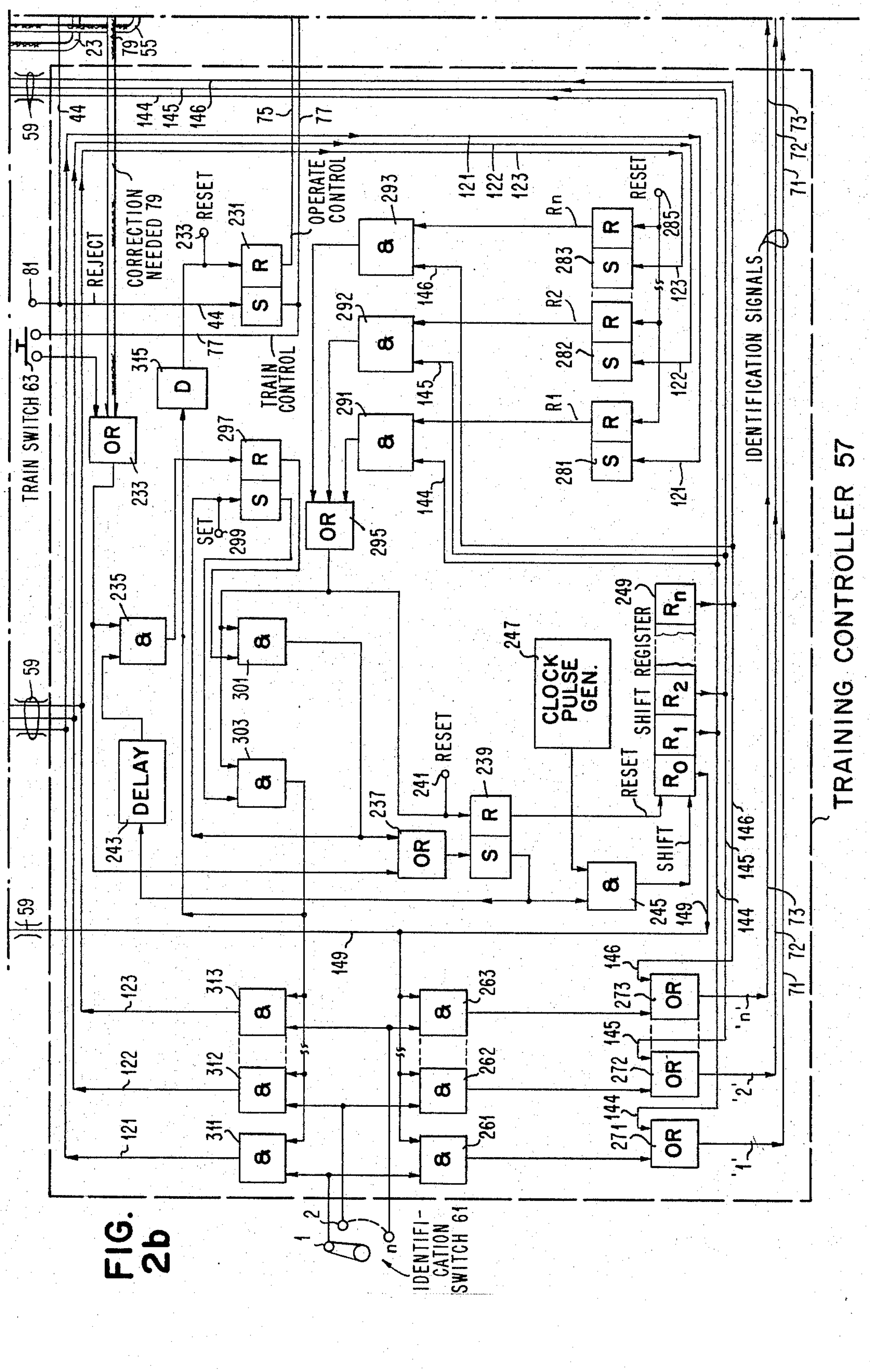
Figure 2C:
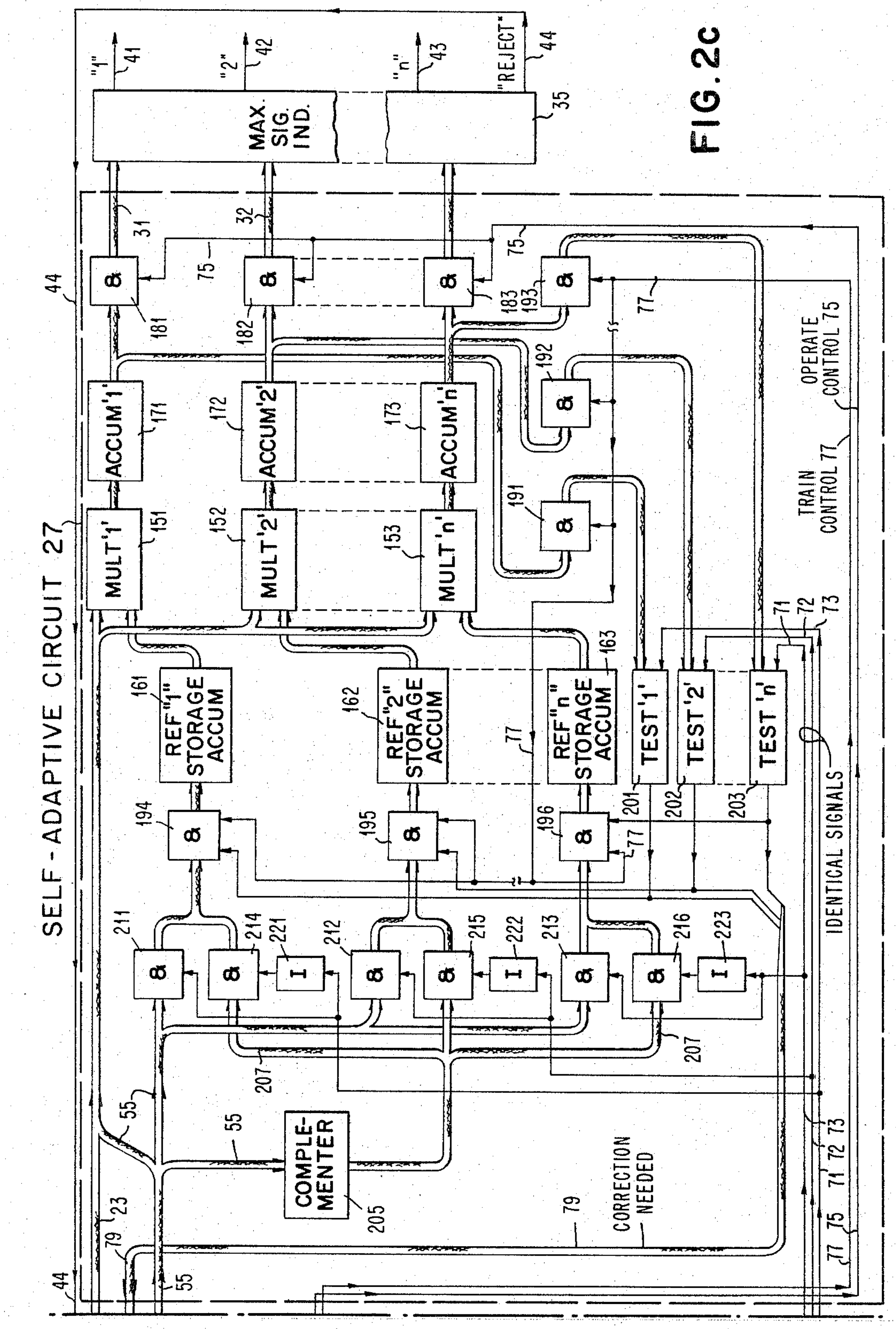
Figure 3:
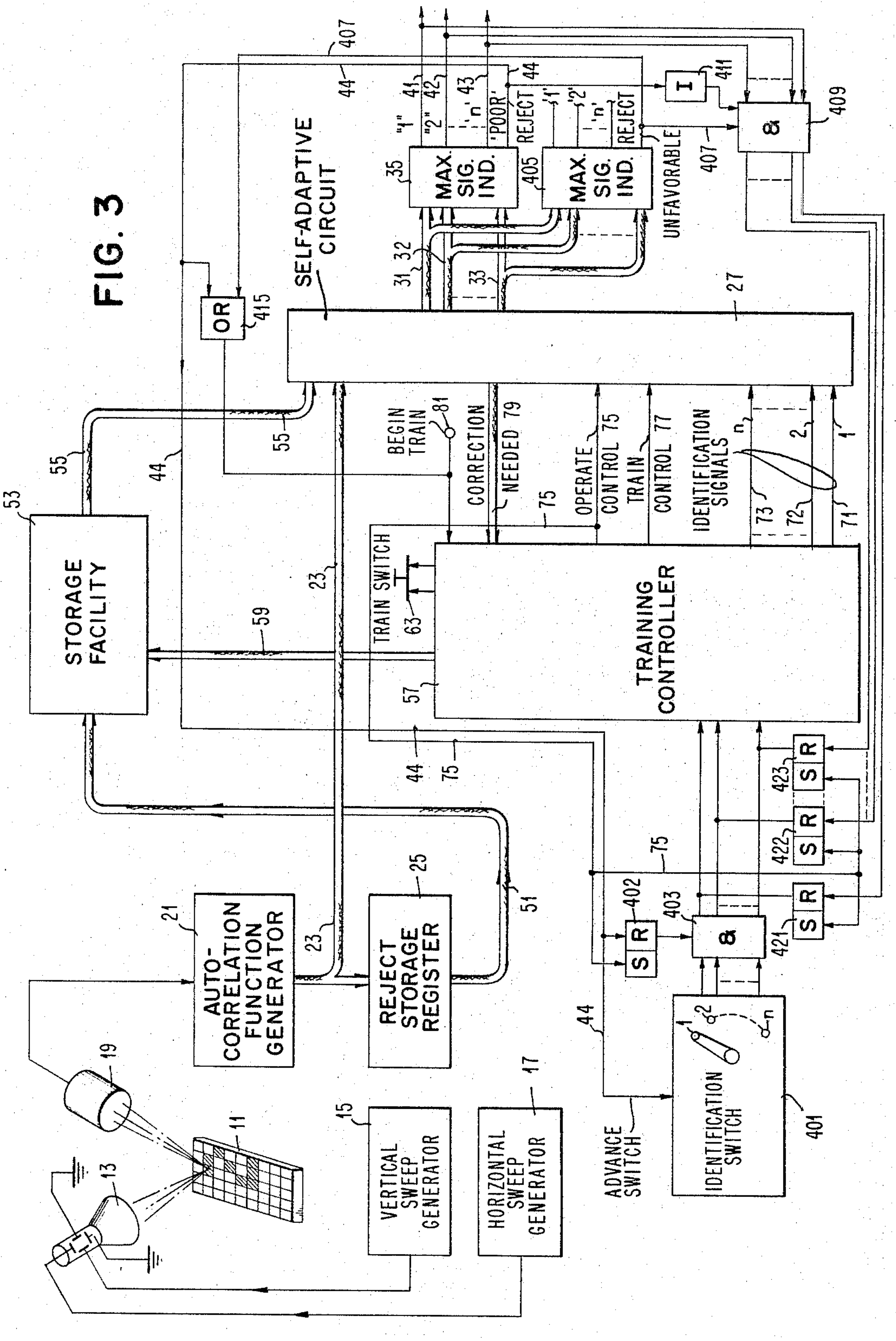

FIGS. 2*a* through 2*c* are schematic drawings illustrating the details of the embodiment of the present invention shown in FIG. 1; and FIG. 3 is a block diagram illustrating another embodiment of the present invention.

A self-adaptive character recognition system embodying the present invention is shown in FIG. 1. In this embodiment an operator provides assistance in identifying rejected characters so that the self-adaptive system can be updated.

Another self-adaptive character recognition system embodying the present invention is shown in FIG. 3. Here updating is accomplished automatically without requiring operator assistance. Dynamic updating is performed where the characters presented for recognition vary slightly from the previously applied characters of the same type. Also, automatic classification can be achieved where the type of characters is previously unknown.

The system of FIG. 1 is illustrated in detail in FIGS. 2*a*–2*c*. FIG. 3 is a slightly modified form of the embodiment shown in FIG. 1 requiring no detailed illustration similar to that shown in FIGS. 2*a*–2*c*.

The character to be identified is presented to the self-adaptive recognition system by scanning a matrix of blocks 11 shown in FIG. 1. A character in the shape of a number "2" is shown by the cross-hatched blocks on matrix 11. A scanner 13 illuminates each one of the blocks on matrix 11 in a sequential fashion under control of a vertical sweep generator 15 and a horizontal sweep generator 17. A phototube 19 picks up the signals resulting from the illumination of the blocks on matrix 11. A signal of smaller amplitude is generated when a cross-hatched block is illuminated. In this manner a binary signal is developed.

The train of binary signals developed by the phototube 19 is applied to an auto-correlation function generator 21. Generator 21 auto-correlates the train of signals from tube 19 in a manner described in detail in copending application Ser. No. 276,612 entitled "Adaptive Computing Techniques" by A. G. Konheim and H. J. Greenberg, now Patent No. 3,267,431. The output of the auto-correlation function generator 21 is in the form of a parallel array of signals appearing on a plurality of lines within a cable 23. The signal on cable 23 may be considered to be the pattern of data to be recognized by the self-adaptive recognition system shown in FIG. 1. Each character scanned on matrix 11 results in a corresponding pattern of signals on cable 23. It has been found advantageous to auto-correlate the signals developed by tube 19 prior to entering them into the self-adaptive recognition system. However the train of signals from tube 19 could be used directly, or some other function could be performed upon them besides the auto-correlation function prior to entry into the self-adaptive recognition system.

The self-adaptive recognition system shown in FIG. 1 operates in two modes. During a training mode, the system is trained to recognize sample patterns. During an operate mode, the system compares incoming patterns with a plurality of reference patterns to determine the identity of the incoming pattern.

*Operate mode*

Referring to FIG. 1, the signals on cable 23 are applied to a reject storage register 25 and a self-adaptive circuit 27. The reject register 25 provides a temporary storage for use during the training mode which is described later. In the operate mode the pattern on cable 23 is generated by scanning an unknown pattern and is applied to circuit 27 where it is compared with a plurality of reference patterns stored within the circuit 27. After the comparison is completed, signals appear on a plurality of output cables 31–33. Each cable includes the results of the comparison of the pattern on cable 23 with each of the reference patterns stored in circuit 27. Three cables 31–33 are shown in FIG. 1. However additional cables are employed where more than three reference patterns are stored within circuit 27. A maximum signal indicator 35 performs the function of determining which one of the signals on cables 31–33 has the maximum value. The maximum signal corresponds to the stored pattern most nearly matching the scanned pattern. A single signal appears on one of a plurality of lines 41–43. For example when the character "2" is scanned on matrix 11, a signal appears on line 42 identifying the character as a "2." However, when a character is scanned on matrix 11 which results in a group of signals on cables 31–33 having the two highest values very close to each other then a reject signal is supplied by maximum signal indicator 35 on a line 44.

The difference between the maximum signal and the second highest signal appearing on cables 31–33 represents the discrimination for the character presented for recognition. That is, the ability of the adaptive circuit 27 to determine the identity of the character depends upon the degree of comparison with the various reference patterns stored within the circuit 27. Therefore, if a high degree of comparison exists between the pattern on cable 23 and only one of the reference patterns, then the circuit 27 exhibits a high discrimination for the particular pattern on cable 23. Low discrimination occurs where the pattern on cable 23 is similar to two or more reference patterns indicating that the circuit 27 cannot make a favorable discrimination between the closest reference patterns. The level of discrimination necessary to prevent the occurrence of a reject signal on line 44 can be adjusted to suit the particular application for which the self-adaptive system is employed.

*Training mode*

During the training operation of the self-adaptive system shown in FIG. 1, the pattern on which the system is to be trained is scanned and stored in reject storage register 25. The contents of the reject storage register 25 are applied to a cable 51. The pattern of signals on cable 51 is the same as that on cable 23 and is maintained on cable 51 during the training mode so that a plurality of comparison operations can be performed.

The signals on cable 51 are applied to a storage facility 53. The function of the facility 53 is to store each of the sample patterns used during the training of the self-adaptive circuit 27. The sample patterns stored in facility 53 are supplied one at a time via a cable 55 to the adaptive circuit 27. Selection of the order in which the sample patterns are applied to the self-adaptive circuit 27 is performed by a training controller 57 which is connected to facility 53 via a cable 59.

The training controller 57 begins the training mode in response to a signal on reject line 44 connected thereto. In the embodiment shown in FIG. 1, an operator assists the self-adaptive system during the training mode. After a reject signal is received on line 44 indicating that a character cannot be read by the system with sufficient discrimination, the operator observes the rejected character. After determining the identity of the character, the operator turns an identification switch 61 to the proper setting. For example if the character is a "2" appearing on matrix 11, then the identification switch 61 is set to the second position. Following this a train switch 63 is depressed and released activating the training controller 57. The adaptive circuit 27 is trained on all of the sample patterns which were previously used for training and stored in facility 53 and is also trained using the rejected character stored in register 25. With respect to the rejected pattern, the proper identity is supplied by the identification switch 61 via a plurality of identification signal lines 71–73. The reference patterns stored in circuit 27 are adjusted so that the rejected pattern compares favorably with one of the reference patterns stored in circuit 27 corresponding to the position to which the identification switch 61 is set. At the end of the training mode the pattern stored in the reject register 25 is entered into the storage facility 53 as one of the group of stored sample patterns.

In addition to selecting the sample patterns to be supplied to the adaptive circuit 27, the training controller 57 also controls the mode of operation of the self-adaptive circuit 27. The latter control is achieved by signals on an operate control line 75 and a train control line 77.

The circuit 27 shown in FIG. 1 supplies signals to the training controller 57 via a cable 79 indicating whether adjustment has been made during the training mode. If adjustment has been made, the training mode is repeated in order to update the self-adaptive circuit.

*General description of initial training of system*

In operation the self-adaptive character recognition system shown in FIG. 1 may be initially trained on a plurality of sample patterns. To begin the initial training mode a signal is applied to line 44 via an input terminal 81. The operator then sets the identification switch 61 to the first position. The first character, for example, digit 1, is scanned and the pattern of signals is supplied to the adaptive circuit via reject register 25, storage facility 53 and cable 55. The reference pattern within circuit 27 corresponding to the first position of the identification switch 61 is adjusted to compare favorably with the first sample pattern. All other reference patterns within circuit 27 are adjusted to provide a mismatch.

The identification switch 61 is advanced to the second position and the second sample pattern, for example a digit 2, is scanned on matrix 11. The adaptive circuit 27 is trained on the second pattern stored in register 25. Following this the adaptive circuit 27 is again trained on the first pattern now stored in facility 53 to determine whether sufficient discrimination exists between the first sample pattern and the second reference pattern in circuit 27. If adjustments are needed during this latter training as indicated by a signal on cable 79, the training mode is repeated using the first and second sample patterns.

Subsequent sample patterns are scanned on matrix 11 until a sufficient number of sample patterns have been used. Each pattern is stored in facility 53 for future use. When the initial training mode has been completed, the self-adaptive recognition system shown in FIG. 1 is ready for the operate mode. Subsequently, characters are presented to the scanner 13 and phototube 19 for recognition by the system of FIG. 1.

*General description of subsequent training of system*

The system shown in FIG. 1 remains in the operate mode identifying characters until one is presented which results in a reject signal on line 44. At this time the operator assists by placing the identification switch 61 in the position which corresponds to the rejected pattern. If the rejected character is a slightly modified form of one of the initial sample patterns, the operator moves the identification switch 61 to the position corresponding to the initial sample pattern. On the other hand if the rejected character is not related to any of the initial sample patterns, the operator moves the identification switch to the next highest position not used heretofore.

The training switch 63 is depressed to begin the training mode. First, the self-adaptive circuit 27 is trained on the rejected pattern. Then the initial sample patterns are supplied sequentially by storage facility 53 to circuit 27 so that the corresponding reference patterns within the circuit 27 can be updated to improve discrimination between the sample patterns and the rejected pattern.

The storage facility 53 performs the function of saving each of the sample patterns so that they may be used during later training modes. In order to effectively update the self-adaptive circuit 27, a sufficient number of the initial sample patterns must be stored and re-presented to the circuit 27 along with the rejected pattern.

The general description of the operator assisted embodiment of the present invention shown in FIG. 1 has been described above. The general description of the fully automatic embodiment of the present invention shown in FIG. 3 is deferred until after the details of the embodiment in FIG. 1 are described with reference to FIGS. 2*a*–2*c* immediately below.

*Detailed description of storage facility FIG. 2a*

FIG. 2 illustrates the manner in which FIGS. 2*a*–2*c* are grouped to form a composite drawing. FIG. 2*a* illustrates in detail the contents of the storage facility 53. FIG. 2*b* illustrates the training controller 57 in detail. FIG. 2*c* illustrates one example of the contents of the self-adaptive circuit 27. The example illustrated in FIG. 2*c* is identical to the one described in the previously mentioned co-pending application Ser. No. 276,612. Also shown in this co-pending application are the details of the maximum signal indicator 35, auto-correlation function generator 21 and circuitry for synchronizing the operation of the horizontal and vertical sweep generators 15 and 17 with the remainder of the self-adaptive system. Accordingly only sufficient details of the self-adaptive circuit 27 are included in the present specification so that the manner in which the self-adaptive circuit 27 cooperates with the storage facility 53 and training controller 57 may be fully understood. Further details of the self-adaptive circuit 27 not essential to the present invention may be found in the above identified co-pending application.

As shown in FIG. 2*a* the output of the reject storage register 25 which includes the designation $R_R$ in FIG. 2*a* is applied via cable 51 to a plurality of AND gates 101–104. The contents of the register 25 may be placed into any one of a plurality of storage registers 111–113 designated $R_1$ through $R_n$ respectively, by enabling AND gates 101–103. This is accomplished under control of the identification switch 61, FIG. 2*b*. The enabling signals are applied via lines 121–123 contained within cable 59 shown in FIG. 1.

The outputs of the storage registers 111–113 are gated by a plurality of AND gates 131–133. Under control of enabling signals on a plurality of lines 144–146, the AND gates pass the contents of the storage registers 111–113 to an OR gate 147. Also applied to OR gate 147 is the output of AND gate 104 enabled by a signal from a line 149 in cable 59. OR gate 147 provides the signal on cable 55 shown in FIG. 1, connected between the storage facility 53 and self-adaptive circuit 27.

Summarizing the operation of storage facility 53, patterns stored in the register 25 may be inserted into one of the registers 111–113 under control of the signals on lines 121–123. The patterns stored in registers 111–113 may be read out of the storage facility 53 under control of the signals on lines 144–146. Further the reject pattern stored in register 25 may be permitted to pass through the storage facility 53 (gates 104 and 147) to the self-adaptive circuit 27 in response to signals on line 149.

*Detailed description of self-adaptive circuit FIG. 2c*

Next described is the self-adaptive circuit 27 illustrated in detail in FIG. 2*c*. The circuit 27 has a training mode and an operating mode as described generally above.

In the operating mode the input pattern on cable 23 is applied to the circuit 27. As discussed above the pattern on cable 23 is generated by scanning the character on matrix 11, shown in FIG. 2*a* and auto-correlating the results in generator 21. The input pattern on cable 23 is applied to one leg of a group of multipliers 151–153 in FIG. 2*c*. Applied to the other leg of the multipliers is the output from one of a number of reference storage accumulators 161–163. The loading of accumulators 161–163 is described hereinafter. The multipliers 151–153 perform the function of coincidently comparing the contents of each of the reference storage accumulators 161–163 with the input pattern on cable 23. Each time a match occurs between the array of signals on cable 23 and the array of signals stored in accumulators 161–163 the corresponding multipliers 151–153 provide a signal to a group of accumulators 171–173. The accumulators 171–173 perform the function of summing the number of matches and providing a proportionate output signal to a group of AND gates 181–183.

Each of the AND gates 181–183 is enabled by a signal on operate control line 75. When the self-adaptive system is in the operate mode, a signal appears on operate control line 75 enabling AND gates 181–183 shown in FIG. 2*c*. In this condition the contents of accumulators 171–173 are applied to maximum signal indicator 35 via cables 31–33. As outlined in the general description above indicator 35 performs the function of determining which of the accumulators 171–173 contains the maximum value. For example, when the number "2" is being recognized, a signal appearing on line 42 from maximum signal indicator 35 indicates that the most favorable comparison occurred between the contents of reference storage accumulator 162 and the input pattern on cable 23. The number "2" is placed adjacent to the line 42. Also the storage accumulator 162, multiplier 152, and accumulator 172 include a designation "2." The blocks designated with a "2" will be referred to as the "2" channel. Other blocks designated with a "1" and an "*n*" will be referred to as the "1" channel and the "*n*" channel, respectively.

The maximum signal indicator 35 also performs the function of determining when two or more accumulators 171–173 contain values so close together that sufficient discrimination is not achieved. In this condition a signal is supplied on reject line 44.

Additional channels can be included in the self-adaptive circuit 27 shown in FIG. 2*c* to accommodate any number of reference patterns. Broken lines are shown in FIG. 2*c* at the points where additional channels may be added.

When the system fails to recognize a scanned character, the training mode of operation of the self-adaptive circuit 27 shown in detail in FIG. 2*c* begins with a reject signal on line 44. The reject signal on line 44 is fed back to the training controller 57 causing the operate control signal on line 75 to terminate and a signal to appear on the train control line 77 in a manner to be described in detail below with reference to FIG. 2*b*. Termination of the signal on operate control line 75 blocks AND gates 181–183. The appearance of the signal on train control line 77 enables a group of AND gates 191–196. During the training mode of operation the self-adaptive circuit 27 receives signals on cable 55 instead of cable 23 which comes directly from generator 21. Cable 55 is joined to cable 23 so that multipliers 151–153 perform their operation on the input patterns from storage facility 53 during the training mode.

The AND gates 191–193 pass the outputs of accumulators 171–173 to a group of test circuits 201–203 respectively. The identification signals 71–73 are applied to test circuits 201–203. As described above the identification signals 71–73 identify the particular pattern appearing on cable 55. The identification may be made by the operator setting the identification switch 61, FIG. 2*b*, or the training controller 57 provides the identification in a manner to be described in detail below with reference to FIG. 2*b*. In either case one of the test circuits 201–203 is activated with a positive signal, while the remaining test circuits are activated with a negative signal.

Each of the test circuits 201–203 includes one of the designations "1," "2," or "*n*" indicating that it is associated with a particular one of the channels in the self-adaptive circuit 27. The function of each of the test circuits 201–203 is to determine whether the input pattern on cable 55 can be identified with sufficient discrimination, or whether correction to the reference storage accumulators 161–163 is necessary.

When the positive identification signal appears on line 72, test circuit 202 compares the output of accumulator 172 with a threshold value stored in the test circuit 202. If the threshold is not exceeded, then an output is provided indicating that the self-adaptive circuit 27 has not identified the input pattern on cable 55 with sufficient discrimination. This type of discrimination is called positive discrimination since a favorable comparison would result in a number of matches exceeding the threshold of the test circuit 202.

The circuits 201–203 also examine the circuit 27 for negative discrimination. For this test, the amount of mismatch between the reference storage accumulators 161–163 and the input pattern on cable 55 is examined. Where the input pattern is the number "2," circuits 201 and 203 receive a negative identification signal on lines 71 and 73. A comparison is made between the output of accumulators 171 and 173 with another threshold, lower than the one used to test for positive discrimination, stored within test circuits 201 and 203 respectively. If the lower threshold is exceeded an output is provided by the test circuits 201 and 203.

In summary, an output is provided from test circuit 202 whenever an insufficient number of matches occur between the input pattern (number "2") on cable 55 and reference storage and accumulator 162. Further, the test circuits 201 and 203 provide an output whenever too many matches occur between the input pattern and reference storage and accumulators 161 and 163.

The output of the test circuits 201–203 is used to control the adjustment of the contents of reference storage accumulators 161–163. Since there are two types of tests performed, positive discrimination and negative discrimination, the contents of reference storage accumulators 161–163 is either increased or decreased accordingly. The bi-directional adjustment is accomplished by generating the complement of the input pattern on cable 55. A complementer 205 performs this function and provides an output on cable 207. A group of AND gates 211–213 receives the true form of the input pattern on cable 55, while another group of AND gates 214–216 receives the complement form on cable 207.

Each of the reference storage accumulators 161–163 requiring adjustment is updated by adding either the true form of the input pattern on cable 55 or the complement form on cable 207. Addition of the complement form of the input pattern has the same effect as subtracting the true form of the input pattern. Such adjustment is accomplished by connecting the outputs of AND gates 211 and 214 to the input of AND gate 194. AND gate 195 receives the outputs of AND gates 212 and 215, while the outputs of AND gates 213 and 216 are applied to AND gate 196. AND gates 211–213 are enabled directly by the signals on identification lines 71–73. AND gates 214–216 are enabled by the signals on lines 71–73 after being passed through a group of inverters 221–223. Therefore the true form of the signal on cable 55 is permitted to pass through to one of the AND gates 194–196 whenever a signal appears on one of the corresponding identification lines 71–73. The complement form of the input pattern on cable 207 is permitted to pass through to the remaining AND gates 194–196 having no signal on the corresponding identification lines 71–73.

AND gates 194–196 are controlled by the outputs of test circuits 201–203. In operation whenever correction of a particular reference storage accumulator 161–163 is required the associated AND gate 194–196 is enabled. Each of the gates 194–196 passes the true or the complement form of the input pattern to be added to the associated reference storage accumulators 161–163. For example where the input pattern to circuit 27 in FIG. 2*c* is the number "2" and test circuit 202 indicates that there is insufficient positive discrimination, AND gate 195 is opened causing the true form of the pattern "2" to be added to reference accumulator 162. This causes the match between reference accumulator 162 and the pattern "2" to be improved. In a like manner when test circuits 201 and 203 indicate that insufficient negative discrimination exists AND gates 194 and 196 are opened causing the pattern "2" to be subtracted from reference accumulators 161 and 163. This results in a greater mismatch between pattern "2" and the reference accumulators 161 and 163 causing the discrimination of self-adaptive circuit 27 to be improved.

In this manner the contents of the reference storage accumulators 161–163 may be updated so that sufficient positive and negative discrimination is observed by the test circuits 201–203. After favorable discrimination has been achieved the self-adaptive circuit 27 is returned to the operating mode by discontinuing the signal on line 77 and applying a signal to line 75 in a manner to be described in connection with training controller 57.

*Detailed description of training controller FIG. 2b*

Having described above the details of the storage facility 53 and the self-adaptive circuit 27, the broad function of the training controller 57 is presented at this time. During the operating mode the training controller is idle along with the storage facility 53 and all data flows from generator 21 to circuit 27 through cable 23. However once the training mode is initiated by a reject signal on line 44, the training controller 57 performs the broad function of reading the sample patterns out of the storage registers 111–113 and applying them to the self-adaptive circuit 27. At the same time the training controller 57, by means of the switch 61, identifies the sample pattern supplying a signal on one of the lines 71–73. Further, with the assistance of an operator the pattern causing the reject and stored in register 25 is applied to the circuit 27 via cables 51 and 55 along with the proper identification signal on lines 71–73. The training controller 57 also monitors the operation of the self-adaptive circuit 27 during the training mode to determine whether a further repetition of the training mode is necessary.

The details of the manner in which the training controller 57 performs the broad functions outlined above are set out below with respect to FIG. 2*b*. A trigger 231 is initially placed in the reset condition by a signal on reset terminal 233. In operation, when the system fails to recognize a pattern, a reject signal appears on line 44 and sets the trigger 231 in the set state terminating the signal on operate control line 75 and producing a signal on train control line 77. The self-adaptive circuit 27 is now in the training mode. The letter S designates the set side while the letter R designates the reset side of trigger 231 and all other triggers illustrated in FIGS. 2*a*–2*c*.

The set output terminal of trigger 231 is also connected to train switch 63. After the operator has set the identification switch 61 to the setting corresponding to the rejected pattern, the train switch 63 is depressed and released. Switch 63 may be any suitable type which provides a pulse of short duration independent of the time taken for the operator to release the switch. A pulse generator, not shown, may also be placed in series with switch 63 to provide fast pulses to an OR gate 233. The output of OR gate 233 is applied to an AND gate 235 and an OR gate 237. At this time the other leg of AND gate 235 is not enabled. Therefore no output is provided. The signal generated by depressing the train switch 63, having passed through OR gate 233 also passes through OR gate 237 and places a trigger 239 into the set state. The trigger 239 was initially placed in the reset state by a signal on reset terminal 241. The signal appearing on the set output terminal of trigger 239 is fed back through a delay 243 to the other input leg of AND gate 235. The delay 243 is made sufficiently long so that the signal generated by the train switch 63 discontinues prior to the arrival of the signal at the input of AND gate 235 from delay 243. Therefore no signals are passed by AND gate 235 in response to the initial signal from train switch 63. A description of the function of the output of AND gate 235 is postponed until later in the detailed description of training controller 57.

The signal appearing on the set output terminal of trigger 239 also is applied to one input of an AND gate 245. The other input of AND gate 245 receives pulses from a clock pulse generator 247. The clock pulses from generator 247 are separated by an amount of time sufficient to permit the adjustment of storage registers 161–163 in the self-adaptive circuit 27 shown in FIG. 2*c*.

The clock pulses from generator 247 are fed through AND gate 245 to the shift input of a shift register 249. All of the shift register positions designated $R_R$, R, through $R_n$ are initially placed in the off state in response to reset signal from trigger 239. The first clock pulse advances the shift register to the first position $R_R$ providing an output on line 149 connected to AND gate 104 in FIG. 2*a*.

The contents of the reject storage register 25 are passed through AND gate 104 and OR gate 147 to the self-adaptive circuit 27 via cable 55 in FIG. 2*c*. At the same time the line 149 enables one input of a plurality of AND gates 261–263. The other input of each of the AND gates 261–263 is connected to a different position of identification switch 61. The AND gate having both of its inputs present provides an output to a corresponding one of a group of OR gates 271–273. The outputs of OR gates 271–273 provide the identification signals on lines 71–73 supplied to the self-adaptive circuit 27 shown in FIG. 2*c*.

Summarizing the description up to this point, the reject signal on line 44 causes shift register 249 to advance to the first position. The signal provided by shift register 249 passes the contents of reject storage register 25 to the self-adaptive circuit 27. At the same time the proper identification of the reject pattern is supplied to circuit 27 via lines 71–73 so that the reference storage accumulators 161–163 may be updated.

When the second clock pulse is provided by generator 247, the shift register 249 advances to the second position $R_1$ causing the output from the first position to terminate, and the output from the second position to begin. The output of the second position $R_1$ is connected to line 144. The signal on line 144 opens AND gate 131 in FIG. 2*a* to pass the contents of storage register 111 through AND gate 131, and OR gate 147 to self-adaptive circuit 27 via cable 55. At the same time the signal on line 144 is applied to OR gate 271. The output of OR gate 271 provides an identification signal on line 71 connected to self-adaptive circuit 27. The self-adaptive circuit 27 trains on the sample pattern stored in the register 111 in a manner described in detail above.

Each of the positions of shift register 249 is designated with one of the numbers $R_R$, $R_1$, $R_2$ and $R_n$. These designations correspond to the designations appearing on reject storage register 25 and storage registers 111–113 respectively. As the shift register 249 continues to advance through positions $R_2$ through $R_n$ the contents of the corresponding registers designated $R_2$ through $R_n$ are successively aplied to the self-adaptive circuit 27 in FIG. 2*c*, along with the proper identification signals on lines 71–73.

In order to prevent the shift register from advancing past the highest position corresponding to the last one of the storage registers 111–113 containing a sample pattern, apparatus is provided for determining which ones of the storage registers 111–113 contain sample patterns. A group of triggers 281–283 is shown in FIG. 2*b* having symbols $R_1$, $R_2$ and $R_n$ adjacent thereto corresponding to the symbols applied to storage registers 111–113. Prior to the start of the initial training mode, the triggers 281–283 are initially placed in the reset condition in response to a signal on a reset terminal 285. Each time a sample pattern is read into one of the storage registers 111–113 the corresponding one of the triggers 281–283 is placed in the set state by signals appearing on lines 121–123 connected to AND gates 101–103 and to triggers 281–283 respectively. Each time a signal appears on one of the lines 121–123 the contents of reject storage register 25 are read into one of the storage registers 111–113. At the same time the signal on one of the lines 121–123 is applied to the set input terminal of the corresponding one of the triggers 281–283 thereby placing it in the set state. A description of the manner in which the signals on lines 121–123 are generated is reserved until a later point in the description of the training controller 57.

In order to determine when the shift register 249 has advanced through all of the positions corresponding to the registers 111–113 which contain stored patterns, the setting of triggers 281–283 is compared with the position of shift register 249 by a group of AND gates 291–293. The reset output terminal of triggers 281–283 is connected to one input of AND gates 291–293 respectively. The other inputs of AND gates 291–293 are connected to lines 144–146 containing the signals provided by positions $R_1$, $R_2$ and $R_n$ of shift register 249. In operation, as the shift register advances signals are applied to AND gates 291–293 in a sequential manner. The reset output of triggers 281–283 is connected to the AND gates 291–293 respectively so that when the associated trigger is in the set state the AND gate is blocked. However when one of the AND gates 291–293 having a trigger connected thereto in the reset condition is pulsed by the shift register 249, a signal is sent to an OR gate 295.

A signal appearing at the output of OR gate 295 indicates that the shift register 249 has advanced past the position corresponding to the last one of the storage registers 111–113 containing a sample pattern. The output of OR gate 295 is fed to the reset input terminal of trigger 239. The reset output terminal of trigger 239 provides a reset signal to shift register 249 clearing the register so that the next shift register operation begins at the first position, $R_R$.

Following the reset of the shift register 249, the training controller 57 will either repeat the training operation, or return the self-adaptive circuit 27 to the operating mode. The mode depends upon whether a correction needed signal appeared on cable 79 at any time during the training mode. The correction needed signals are applied to OR gate 233 and pass through AND gate 235 which is conditioned through delay 243 by the set state of trigger 239. The output of AND gate 235 is applied to the reset input terminal of a trigger 297. Prior to starting the training mode, the trigger 297 was placed in the set condition by a signal on a set terminal 299. If a correction needed signal appears on cable 79 at any time during the training mode, the trigger 297 is placed in the reset condition. One input of an AND gate 301 receives a signal from the reset output terminal of trigger 297. If a correction needed signal does not occur on cable 79 at any time during the training mode, the trigger 297 remains in the set condition providing a signal on one input of an AND gate 303. The other inputs of AND gates 301 and 303 are connected to the output of OR gate 295. Therefore when the last pattern stored in registers 111–113 has been used in the training mode, the signal provided by OR gate 295 passes through either AND gate 301 or AND gate 303.

If a correction needed signal is received on cable 79 during the training mode AND gate 301 passes a signal to OR gate 237 which places the trigger 239 in the set condition to initiate the beginning of another training mode. The signal from AND gate 301 is also fed back to set trigger 297 in the set condition in order to determine whether any correction needed signals are received on cable 79 during the next training mode.

On the other hand if no correction needed signals are received on cable 79 during a training mode the signal from OR gate 295 is passed through AND gate 303 to perform two operations. The first is to condition one input of a group of AND gates 311–313. The other inputs of AND gates 311–313 are conditioned by a signal from one of the positions of identification switch 61. It is recalled that the identification switch 61 has been set to a position corresponding to the identity of the pattern stored in the reject register 25 in FIG. 2*a*, which in the operate mode was the pattern which the system failed to identity, for example the number "2." Therefore, at this time AND gate 312 produces a signal on line 122 which opens AND gate 102. The contents of reject storage register 25 is transferred into storage register 112 substituting for the previous contents, if any, in that storage register. If no sample pattern was previously stored in the storage register 112 then the trigger 282 is switched from the initial reset state to the set state by the signal on line 122.

In some applications it may be possible to completely fill the storage facility 53 with sample patterns. In this case a connection, not shown, may be made between the last position $R_n$ of the shift register 247 and OR gate 295 in order to reset the shift register 249 and repeat the training mode or go into the operate mode as described above.

The second operation performed by the output of AND gae 303 is to return the self-adaptive circuit 27 to the operating mode. This is accomplished by passing the signal from AND gate 303 through a delay 315 to the reset input of trigger 231. The trigger 231 is reset to provide a signal on operate control line 75 after an interval of time produced by delay 315 sufficient to permit the contents of reject storage register 25 to be transferred to storage register 112 for the example of the number "2."

*Automatic self-training embodiment, FIG. 3*

Having described the operator assisted embodiment shown in FIG. 1 and illustrated in detail in FIGS. 2*a*–2*c*, the automatic embodiment of the present invention shown in FIG. 3 is described below.

The same numbers are applied to those portions of apparatus which are identical in FIGS. 1 and 3. An identification switch 401 in FIG. 3 corresponds to identification switch 61 in FIG. 1. The identification switch 401 advances from one position to the next position automatically. A suitable stepper switch may be employed to perform this operation in response to signals applied to the identification switch 401 by the reject line 44 connected thereto. The reject line 44 is also applied to the reset input of a trigger 402. The reset output is applied to the enabling input of an AND gate 403 which gates the signals from the positions of the identification switch 401 into training controller 57.

An additional maximum signal indicator 405 is connected in parallel with indicator 35 to receive the output cables 31–33 from self-adaptive circuit 27. The lines "1" through "*n*" of indicator 405 are not used in the present application. The reject output of maximum signal indicator 405 provides a signal on a reject line 407 connected to one enabling input of an AND gate 409. The output lines 41–43 of maximum signal indicator 35 are gated through AND gate 409 to the reset input of a plurality of triggers 421–423. The reset outputs of triggers 421–423 are connected to controller 57. Therefore the training controller 57 receives identification signals from either the identification switch 401 or the output lines 41–43 of maximum signal indicator 35. Reject lines 44 and 407 determine which type of identification signals are to be applied to controller 57.

Reject line 44 provides the second enabling input to AND gate 409 through an inverter 411. Therefore when the reject signal of indicator 405 is present and the reject signal of indicator 35 is absent AND gate 409 is enabled passing the signals on outputs 41–43 to triggers 421–423.

Reject lines 35 and 407 are connected to an OR gate 415 which provides a signal to the "begin train" input of training controller 57. The train switch 63 is locked into the closed position so that the self-adaptive system shown in FIG. 3 begins training immediately after OR gate 415 provides an output signal.

The discrimination level of maximum signal indicator 35 is set relatively low so that a signal is provided on reject line 44 only when two or more of the highest output values from circuit 27 are very close. This discrimination level will be referred to hereinafter as the "poor" discrimination level, since the input pattern cannot be associated with one or the other of the two highest output values.

The discrimination level of the maximum signal indicator 405 is set so that a reject signal is provided on line 407 whenever the outputs 31–33 of self-adaptive circuit 27 are unfavorable. In this condition one of the outputs 31–33 is clearly a maximum value, however, the discrimination between the maximum value and the next highest value is not favorable enough to permit continued operation without some adjustment of the reference storage accumulators 161–163 to improve the discrimination.

When "poor" discrimination is observed the signal on line 44 is fed back to the identification switch 401. This advances the setting of the identification switch 401 to the next unused position.

The training controller 57 at this time performs in the training mode in the same manner as that described in connection with FIGS. 1, and 2*a* through 2*c*. After the training mode is completed, a signal appears on operate control line 75 returning the circuit 27 to the operating mode. The signal on line 75 is also fed back to the set input terminal of trigger 402 blocking AND gate 403.

When another reject condition occurs indicating that the discrimination achieved by self-adaptive circuit 27 is merely "unfavorable" rather than "poor," a signal is provided by maximum signal indicator 405 on line 407 enabling gate 409. The signal appearing on one of the lines 41–43 passes through AND gate 409 and sets one of the triggers 421–423. The output of triggers 421–423 supplies identification signals in the same manner as identification switch 61 in FIG. 1. The training controller 57 performs the same operation described above in connection with FIG. 2*b* updating the reference storage accumulators and self-adaptive circuit 27.

Following the completion of the training mode the signal on operate control line 75 which blocked AND gate 403 also is applied to triggers 421–423 placing them in the set state in readiness for the next signal generated by the outputs 41–43 of maximum signal indicator 35.

Summarizing the operation of the embodiment of the present invention shown in FIG. 3 two types of automatic updating can be accomplished. The first occurs where the self-adaptive circuit 27 is unable to classify the identity of the input pattern due to "poor" discrimination. This is manifested by a signal on reject line 44. A new classification is selected by advancing the position of the identification switch 401. A training mode begins during which one of the reference storage accumulators 161–163 shown in FIG. 2*c* corresponding to the currently set position on identification switch 401 is updated. Following the training mode the pattern which initiated the training operation presently stored in reject storage register 25 is transferred to one of the storage registers 111–113 in FIG. 2*a* corresponding to the setting of identification switch 401 in FIG. 3.

The second manner of adjustment occurs where the discrimination achieved by the self-adaptive circuit 27 is "unfavorable." This is manifested by a signal on reject line 407. Here the outputs of maximum signal indicator 35 are used to update the self-adaptive circuit 27 so that the discrimination is improved. This type of updating is referred to above as dynamic updating. Slight adjustments are made in the reference storage accumulators 161–163 to compensate for variations in the inpjut patterns which belong to the same class as one of the patterns stored in the registers 111–113 in FIG. 2*a*.

*Detailed description of self-training of system in FIG. 3*

The self-adaptive system shown in FIG. 3 performs the function of a classifier capable of "self-training." Here the identity of the input pattern is not known initially. The reference storage accumulators may be cleared at the start or may be preloaded with a random assortment of references by scanning patterns. The operation begins by setting the identification switch 401 initially to the first position and a pulse is applied to terminal 81 placing the self-adaptive circuit in the training mode. The first input pattern is placed in reject storage register 25 by scanning the pattern. The self-adaptive circuit 27 is adjusted automatically so that reference storage accumulator 161 shown in FIG. 2*c* matches the contents of reject storage register 25. Following this the circuit 27 is automatically placed into the operating mode, and the second reference pattern is presented for recognition. The second input pattern is compared with the contents of reference storage accumulators 161–163 and the results of the comparisons are evaluated by maximum signal indicators 35 and 405. If the second pattern compares poorly with the first pattern a new class is set up in response to the signal on reject line 44. If the comparison is "unfavorable" then the reference storage accumulator 161 shown in FIG. 2*c* is dynamically updated to accommodate both the first and second input patterns. Additional input patterns are applied and the same procedure is followed.

After a sufficient number of patterns have been applied to the self-adaptive system of FIG. 3 the values stored in the reference storage accumulators 161–163 should begin to converge on a fixed set. If convergence is not observed then several adjustments may be made before presenting the input patterns again. The "poor" and "unfavorable" discrimination levels can be adjusted. Any one or all of these may aid in bringing about convergence of the system on a set of values contained in reference storage accumulators 161–163. Of course, if no common features exist between the array of input patterns, then the self-adaptive system might not converge. However the absence of common features may also be a valuable discovery in the porcess of identifying the nature of the input patterns.

In the illustrated embodiments of the present invention the maximum signal indicators 35 and 405 provide a reject signal whenever the maximum signal value is too close to the next highest signal value. However other criteria could be used to determine when the ability of the self-adaptive circuit 27 to discriminate between input patterns is "unfavorable" or "poor." For example the past history of the outputs from the self-adaptive circuit 27 over a certain period of time could be considered in order to detect a trend in the ability of the circuit 27 to identify the input patterns. The input patterns may be changing slowly, or drifting at a rate which can be tolerated. Therefore, in this type of embodiment of the present invention an "unfavorable" reject signal would occur when the self-adaptive circuit 27 is rapidly losing the ability to discriminate between input patterns over a given period of time requiring the reference patterns stored in circuit 27 to be updated. A "poor" reject signal would occur when the loss of ability to discriminate is so rapid as to cause the results to be unstable or inaccurate.

Still another criterion for determining whether the output of the self-adaptive circuit 27 is "unfavorable" or "poor" is to examine the degree of match between the input pattern and the corresponding reference pattern in circuit 27. This determination is made by the test circuits 201–203 in FIG. 2*c*. In this embodiment of the present invention apparatus similar to test circuits 201–203 could be employed in the maximum signal indicators 35 and 405 to indicate the amount of positive and negative discrimination. Such an embodiment would detect the set of conditions where one output signal from self-adaptive circuit 27 is clearly a maximum signal, but the maximum signal exhibits only a small positive discrimination level. This would occur where none of the reference patterns match to any appreciable degree with the input pattern. However one pattern has slightly less mismatch than the remaining patterns causing it to appear as a maximum signal. The suggested modification of the present invention would indicate that the comparison is "poor" and create a new classification for such an input pattern.

An alternative manner of loading the storage registers 111–113 in FIG. 2*a* can be employed. In the embodiment described the contents of reject storage register 25 is loaded into one of the storage registers 111–113 even though a sample pattern is already contained therein. Following this, the self-adaptive system trains on the rejected pattern instead of its predecessor, the original sample pattern. For some applications it may be desirable to retain the initial sample pattern and either dispose of the rejected pattern or provide another register in addition to registers 111–113 for retaining the rejected pattern to be used during later training modes. In the case of the latter alternative two of the storage registers 111–113 would be made to correspond to a single position of the shift register 249 during the training mode so that a single one of the reference storage accumulators 161–163 is adjusted to accommodate both patterns.

Further, other self-adaptive circuits beside that illustrated in detail in FIG. 2*c* could be employed in cooperation with the storage facility 53 and training controller 57. Modifications to the detailed circuitry and suitable timing circuitry can be provided to effect this modification.

Still another variation of the present invention can be constructed by eliminating the maximum signal indicator 405. In this embodiment dynamic updating would take place each time an output is provided by maximum signal indicator 35. Such a device could be employed where it is known that no two input specimens are identical so that the self-adaptive system would have to be updated each time a new input pattern is applied.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A self-adaptive system capable of self-training comprising:

means for comparing an input pattern with a plurality of adjustable reference patterns providing an identification signal corresponding to the reference pattern exhibiting the highest degree of similarity with the input pattern, additionally providing a first reject signal whenever unfavorable comparisons are observed, and further providing a second reject signal whenever poor comparisons are observed;

means responsive to said identification signal, said first reject signal, and the absence of said second reject signal for adjusting the reference pattern corresponding to said identification signal to improve the comparison with said input pattern; and means responsive to said second reject signal for adjusting a different one of said reference patterns to compare favorably with each successive input pattern resulting in the occurrence of said second reject signal.

2. A self-adaptive system capable of self-training comprising:

means for comparing an input pattern with a plurality of adjustable reference patterns providing a plurality of output signals each one representing the degree of similarity between a different one of the reference patterns and said input patterns;

maximum signal indicating means connected to receive said output signals for providing an identification signal corresponding to the reference pattern exhibiting the highest degree of similarity with said input pattern, additionally providing a first reject signal whenever unfavorable comparisons are observed, and further providing a second reject signal whenever poor comparisons are observed;

training means for adjusting said reference patterns so that one reference pattern compares favorably with said input pattern; and control means responsive to said identification signal, said first reject signal, and the absence of said second reject signal for selecting the corresponding reference pattern to be adjusted by said training means to compare favorably with said input pattern, and said control means further including means for selecting the reference patterns to be favorably adjusted in a sequential fashion, advancing through said sequence in response to said second reject signal.

3. Apparatus as defined in claim 2 wherein said first reject signal is provided whenever the two reference patterns exhibiting the highest degree of similarity with the input pattern are sufficiently similar to warrant adjustment of said reference patterns, and said second reject signal is provided whenever the two reference patterns exhibiting the highest degree of comparison with the input pattern are so similar as to prevent accurate discrimination therebetween.

4. A self-adaptive system capable of self-training comprising:

self-adaptive means for comparing an input pattern with a plurality of adjustable reference patterns providing an identification signal corresponding to the reference pattern exhibiting the highest degree of similarity with said input pattern, additionally providing a first reject signal whenever an unfavorable comparison is observed, and further providing a second reject signal whenever a poor comparison is observed;

storage means for storing a plurality of sample patterns;

means for selectively applying the sample patterns to said self-adaptive means in response to said reject signals;

means responsive to said identification signal, said first reject signal, and the absence of said second reject signal for adjusting the reference pattern corresponding to said identification signal to exhibit improved comparison with said input pattern; and means responsive to said second reject signal for adjusting a different one of said reference patterns to compare favorably with each different input pattern resulting in the occurrence of said second reject signal.

5. Apparatus as defined in claim 4 wherein the sample patterns are input patterns previously applied to the self-adaptive system.

6. Apparatus as defined in claim 4 wherein the sample patterns are the input patterns producing reject signals.

7. Apparatus as defined in claim 4 wherein said storage means include storage apparatus for storing said input pattern in response to said reject signals.

8. Apparatus as defined in claim 4 wherein said first reject signal is provided whenever the two reference patterns exhibiting the highest degree of similarity with the input pattern are sufficiently similar to make desirable adjustment of said reference patterns.

9. Apparatus as defined in claim 8 wherein said second reject signal is provided when the two reference patterns exhibiting the highest degree of similarity with the input pattern are so similar that proper discrimination cannot be achieved.

10. A self-adaptive system capable of self-training comprising:

self-adaptive means for comparing an input pattern with a plurality of adjustable reference patterns providing a plurality of output signals each one indicating the degree of similarity between the input pattern and a different one of said reference patterns;

maximum signal indicating means connected to receive said output signals for providing an identification signal corresponding to the reference pattern exhibiting the highest degree of similarity with the input pattern, additionally for providing a first reject signal whenever an unfavorable comparison is observed, and for further providing a second reject signal whenever a poor comparison is observed;

storage means for storing a plurality of sample patterns;

means for selectively applying the sample patterns to said self-adaptive means in response to said reject signals to adjust said reference patterns;

means responsive to said identification signal, said first reject signal, and the absence of said second reject signal for adjusting the reference pattern corresponding to said identification signal to improve the comparison with said input pattern; and identification means for sequentially adjusting said reference patterns to compare favorably with each successive input pattern advancing through said sequence in response to said second reject signal.

11. Apparatus as defined in claim 10 wherein the sample patterns are input patterns previously applied to the self-adaptive system.

12. Apparatus as defined in claim 10 wherein the sample patterns are the input patterns producing reject signals.

13. Apparatus as defined in claim 10 wherein said storage means include storage apparatus for storing said input pattern in response to said reject signals.

14. Apparatus as defined in claim 10 wherein said first reject signal is provided whenever the two reference patterns exhibiting the highest degree of similarity with the input pattern are sufficiently similar to make desirable adjustment of said reference patterns.

15. Apparatus as defined in claim 10 wherein said second reject signal is provided when the two reference patterns exhibiting the highest degree of similarity with the input pattern are so similar that proper discrimination cannot be achieved.

References Cited

UNITED STATES PATENTS

| | | | |
|---|---|---|---|
| 3,158,840 | 11/1964 | Baskin | 340—172.5 |
| 3,160,855 | 12/1964 | Holt | 340—146.3 |
| 3,191,149 | 6/1965 | Andrews | 340—172.55 |
| 3,191,150 | 6/1965 | Andrews | 340—146.3 |
| 3,263,216 | 7/1966 | Andrews | 340—146.3 |
| 3,267,431 | 8/1966 | Greenberg et al. | 340—172.5 |

ROBERT C. BAILEY, *Primary Examiner.*

J. P. VANDENBURG, *Assistant Examiner.*